(12) United States Patent
Knudsen et al.

(10) Patent No.: US 7,980,877 B2
(45) Date of Patent: Jul. 19, 2011

(54) ACTUATOR SYSTEM

(75) Inventors: Martin Kahr Knudsen, Sydals (DK); René Sørensen, Gråsten (DK); Anders B. Lorenzen, Aabenrå (DK)

(73) Assignee: Linak A/S, Nordborg (DK)

( * ) Notice: Subject to any disclaimer, the term of this patent is extended or adjusted under 35 U.S.C. 154(b) by 0 days.

(21) Appl. No.: 12/734,605

(22) PCT Filed: Nov. 13, 2008

(86) PCT No.: PCT/DK2008/000405
§ 371 (c)(1), (2), (4) Date: May 12, 2010

(87) PCT Pub. No.: WO2009/062514
PCT Pub. Date: May 22, 2009

(65) Prior Publication Data
US 2010/0311260 A1    Dec. 9, 2010

(30) Foreign Application Priority Data
Nov. 13, 2007    (DK) ................................ 2007 01612

(51) Int. Cl.
*H01R 13/62* (2006.01)
(52) U.S. Cl. ........................................ 439/314; 439/318
(58) Field of Classification Search .................. 439/314, 439/318
See application file for complete search history.

(56) References Cited

U.S. PATENT DOCUMENTS

| | | | |
|---|---|---|---|
| 3,397,378 A | 8/1968 | Dietrich | |
| 3,772,636 A | 11/1973 | Webb | |
| 5,726,508 A | 3/1998 | Neff et al. | |
| 6,162,082 A | 12/2000 | Karsten et al. | |
| 6,443,778 B1 * | 9/2002 | Koch | 439/680 |
| 6,666,701 B1 * | 12/2003 | Burkhardt et al. | 439/314 |
| 6,808,407 B1 * | 10/2004 | Cannon | 439/314 |

FOREIGN PATENT DOCUMENTS

| | | |
|---|---|---|
| CA | 2292884 | 6/2001 |
| EP | 0660452 | 6/1995 |
| WO | 03034548 | 4/2003 |

* cited by examiner

*Primary Examiner* — Gary F. Paumen
(74) *Attorney, Agent, or Firm* — Dykema Gossett PLLC

(57) ABSTRACT

An actuator system comprising a housing (2, 19) having at least one socket (6) for the insertion of an electrical plug (7). The housing (2, 19) is provided with an arrangement which is capable of retaining an electrical plug, preferably of the Jack, DIN or Minifit type, inserted into said socket, said arrangement comprising a union nut (8) which may be retained in a position above the opening of the socket (6), and which at the same time surrounds the plug (7), said union nut (8) being rotatable between an inoperative position in which the plug (7) may freely be inserted and removed, and another position which is a locked position, in which the plug (7) cannot be inserted and, if it is already inserted, cannot be removed.

15 Claims, 4 Drawing Sheets

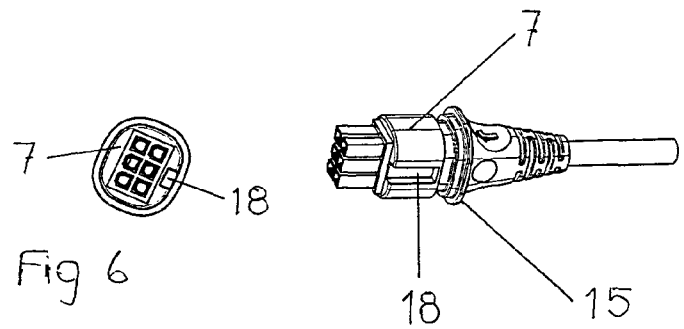
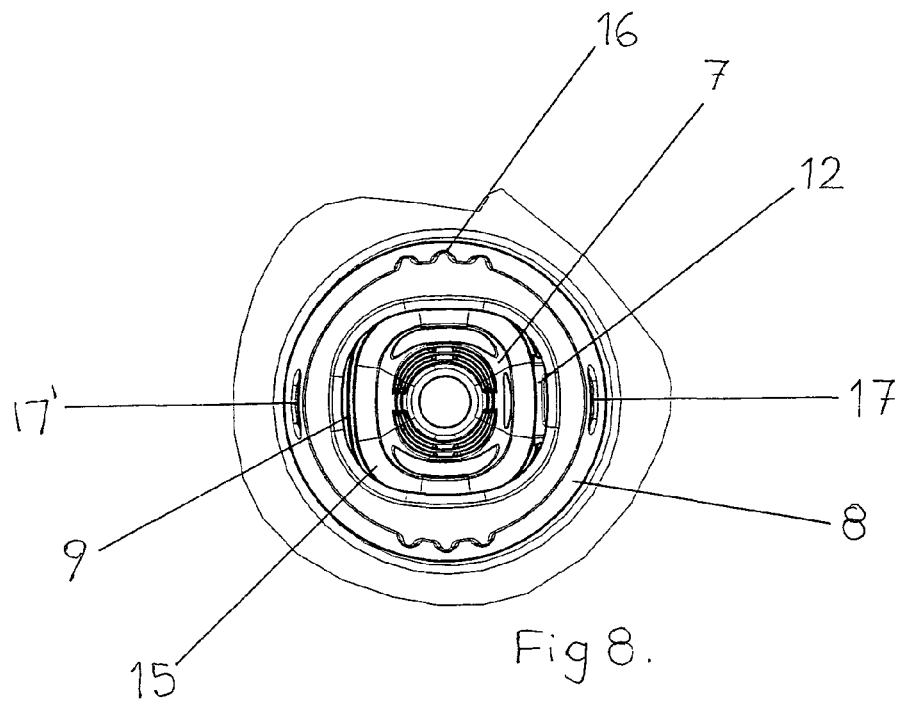
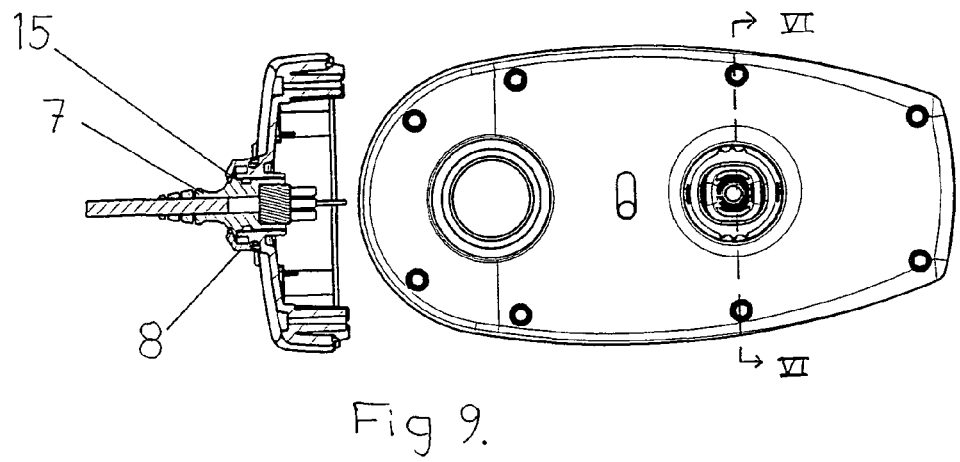

ACTUATOR SYSTEM

BACKGROUND OF THE INVENTION

1. Field of the Invention

The invention relates to an actuator system having at least one arrangement for an electrical plug, the arrangement including a socket and a rotatable union nut in connection with this, the union nut having an opening for inserting the plug into the socket.

2. The Prior Art

Low voltage plug connections are widely used in conjunction with apparatus, equipment and installations, and are well-known. As examples of plugs which are typically used for adjustable pieces of furniture with actuator systems, the conventional Jack or DIN types and the more modern Minifit type (trademark of Molex corp.) can be mentioned. The plugs are normally only fixed in the connection by the clamp connectors of the socket. A plug may therefore be inserted relatively easy into the socket, but it also has the disadvantage that it may unintentionally fall out, either completely or partially. This may e.g. happen when the bed is transported over an uneven surface, or when the cord gets caught in something. Sometimes it is desirable and at times required that a plug cannot readily be removed. If it is an electrically adjustable bed, it is very inconvenient for both the user of the bed and for the nursing staff when a plug falls out, as the bed then loses some of its functionalities e.g. that the resting surface of the bed cannot be adjusted. This also causes an extra strain on the service staff who have to solve the problem. At worst, it could be fatal e.g. when the bed with a patient who is in shock cannot be adjusted to a horizontal resting surface. If a plug is not secured in its socket in the housing, there is the further risk that water and disinfectants may penetrate into the housing during cleaning and cause damage to electronics and plug connections. Perhaps the damage does not appear right away, but can later on develop into e.g. inexplicable interruptions or break-down of the control unit.

EP 0 660 452 to LINAK A/S discloses a union nut having locking means for a plug, where the union nut is divided into two parts, where the first part forms an almost closed circle, and a second part serves to close the circle and surround the plug and lock this against a locking pin on the housing. The solution is usable, but nevertheless not quite practical, as the union nut has to be mounted after the insertion of the plug into the socket and is thereupon locked by inserting the locking means. As the mounting of cables is often carried out when the control unit or the actuator is mounted on the piece of furniture, it causes a good deal of time-consuming inconvenience. Further, there is a possibility that the many components may disappear, causing them not to be mounted, which results in the known disadvantages.

The object of the invention is to provide a simple solution to the outlined problem.

SUMMARY OF THE INVENTION

This is achieved according to the invention by constructing the actuator system, wherein the arrangement for securing a plug in a socket in a housing includes a union nut which may be retained in a position in connection with the opening of the socket, and which at the same time surrounds the plug, the union nut being characterized in that the shape of the cross-section of the plug in an area near the union nut and the shape of the opening in the union nut are adapted such that when the union nut is rotated to a first position, which is an inoperative position, then the shape of the opening of the union nut is rotated to a second position, constituting a locked position, then the shape of the opening of the union nut relative to the shape of the cross-section of the plug in the area near the union nut is such that the union nut obstructs insertion and removal of the plug.

In this way, a solution to the outlined problem is provided in that a plug may be retained in its position in a socket, and furthermore the means making this possible, in the form of a union nut, is mounted on the socket and thus cannot disappear. Further, difficult assembly work is eliminated, as the only requirements are that the plug is inserted, and that the union nut is rotated to the locked position.

The union nut is furthermore protected against being unintentionally rotated back to the non-locked position in that a locking mechanism in the form of a pin on the housing located in the immediate vicinity of the socket is brought into engagement with a groove in the side wall of the union nut and retains the union nut in the locked position.

By means of a simple tool, the pin may be activated through a hole in the side wall of the union nut which is arranged where the groove is provided on the inner side of the side wall of the union nut, and the union nut is rotated back, following which the plug may be pulled out.

The embodiment of the locking mechanism for retaining plugs in a socket according to the invention is particularly simple and user-friendly, as the locking mechanism in the form of a union nut is mounted on the socket of the housing before the plugs are inserted. On the housing at the opening of the socket, the socket is extended as a neck which is formed with a sleeve, down over which the union nut is snapped. On the inner diameter, the union nut is provided with a corresponding sleeve, which matches the sleeve on the neck. The two sleeves thus form cooperating snap locking means. After having been snapped together, the union nut is kept in engagement with the neck. Therefore, there are no loose pieces which can disappear.

The difficult assembly process is eliminated for the same reason, as the plug just has to be inserted through a hole in the front of the union nut, following which the union nut is rotated to a locked position and locks the plug against removal from the socket. The hole in the front of the union nut is adapted to the profile of the plug, so that this may be inserted through the front of the union nut. When the union nut is in the non-locked position, the mechanical coding of the plug is consistent with a mechanical coding which is provided in the socket. Likewise, in this position, the plug fits the coding of the electrical socket, for which reason the plug may be inserted fully to create an electrical connection between the plug and the socket. When the plug is inserted, at a height corresponding to immediately below the underside of the front of the union nut, there is a narrowing of the cross-section of the plug, at least on the large radius of what corresponds to the narrow radius of the cross-section of the plug. When the union nut is rotated, the narrow radius of the hole in the front of the union nut will cause the union nut to lock the plug over the wide radius of the cross-section of the plug. This arrangement further ensures that a plug will have to be inserted fully before it can be locked in the socket by means of the union nut. If it is desirable that the union nut locks the plug for movement in both directions, the plug may be provided with another sleeve, which lies against the front of the union nut on the outer side of this and thus prevents the plug from being pushed further into the socket. In another embodiment, the union nut may be provided with a double front with intervening space for the sleeve of the plug, where the union nut will then lock the plug against movement both out of and further into the housing. Such an arrangement will protect the electrical plug connection against damage caused by blows to the plugs.

Even though the locking mechanism for retaining a plug in a socket is described here as a part which is mounted on a tubular neck and may rotate around this, there is nothing to interfere with the locking mechanism from being constructed in such a way that it comprises a stopper mounted in the socket and retained in the socket. Such a stopper serves to seal a socket which is not being used, and thus protects electronics and plug connections against penetrating liquid or dust. The sealing stopper may be provided with the locking mechanism described above, where the union nut is rotated between a locked position and a non-locked position, so that the sealing stopper is retained in the socket in the locked position. The sealing stopper is also retained in its position in that, in the same way as a union nut of the type which locks a plug in a socket, it is provided with cooperating snap locking means in relation to a counterpart configured on the socket. As described above, it may be snap locking means in the form of sleeves. By minimizing the mutual locking force of the snap locking means it is ensured that the sealing stopper may be removed, if it is desired later on to insert a plug into the socket.

In a particularly simple embodiment, the union nut for the locking of a plug may be retained in its position in the entrance into the socket and receive a plug constructed as a sealing stopper. The sealing stopper is expediently constructed in the same way as the employed electrical plugs at the end which disappears into the socket, and is generally constructed with a view to ensuring that the socket is effectively protected against penetration of liquid or dust. It is preferred that the plug is provided with a strap or the like, which may be grasped when the sealing stopper is to be removed in order to make room for the insertion of another plug into the socket.

Further, it is an advantage that the plug is provided with a gasket, e.g. an o-ring, which seals between the plug and the socket to prevent penetration of liquid or dust. This embodiment will also contribute to retaining a plug in a socket irrespective of whether or not it is locked by the union nut, especially if, somewhere in the longitudinal direction of its tubular extent, the socket is provided with a groove which is intended to receive and position the o-ring on the plug. If a plug serving as a sealing stopper without a wire connection is involved, the binding between the pipe shape of the socket and the o-ring of the sealing stopper will in most cases be sufficient to ensure that the sealing stopper remains in the socket, even though locking with the union nut is preferred.

The locking arrangement for retaining a plug in a socket may be realized in connection with the housing for a linear electrical actuator, but may also be used in housings for control units, indicator boxes, controls, power supplies and housings with other types of electric equipment which is used in an actuator system.

BRIEF DESCRIPTION OF THE DRAWINGS

An embodiment of the actuator system according to the invention will be described in greater details below with reference to the accompanying drawings.

FIG. 6 shows an electrical plug seen from one end, FIG. 7 shows a MINIFIT plug, FIG. 8 shows a top view of the plug in the socket with the union nut in the locked position, FIG. 9 shows a part of the housing with a detailed view of a cross-section of the plug in the socket with the union nut in the locked position.

DETAILED DESCRIPTION OF THE PREFERRED EMBODIMENT

Figure 1:
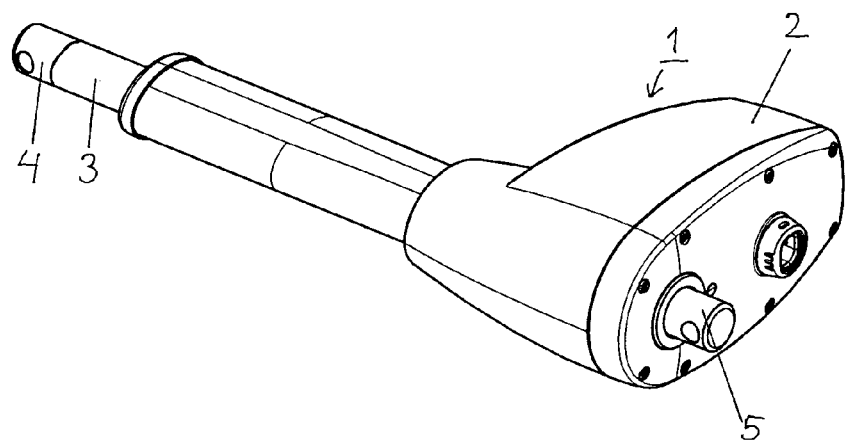
FIG. 1 shows an electrical actuator having a socket and a union nut.

FIG. 1 of the drawing shows an electrically driven actuator 1 composed of a housing 2 and an activation element in the form of a tubular rod 3, on which a front mount 4 is mounted for assembling the actuator in a mechanical structure with a movable part, e.g. a hospital or care bed. The other end of the actuator 1 is provided with a rear mount 5, which is connected to another part of the mechanical structure. When, via a transmission, the motor of the actuator drives a spindle in relation to a spindle nut connected to the activation element and secured against rotation, the actuator will be able to adjust the movable part of the mechanical structure.

Figure 2:
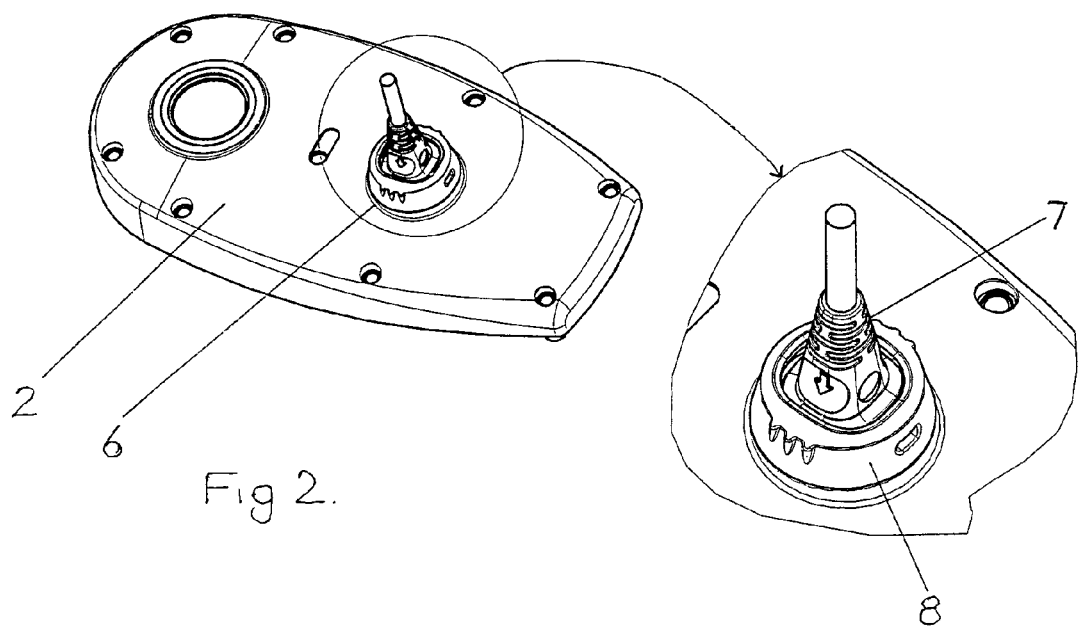
FIG. 2 shows a part of the housing with a socket and a union nut for retaining a plug with a detailed view of the socket with plug.
Figure 3:
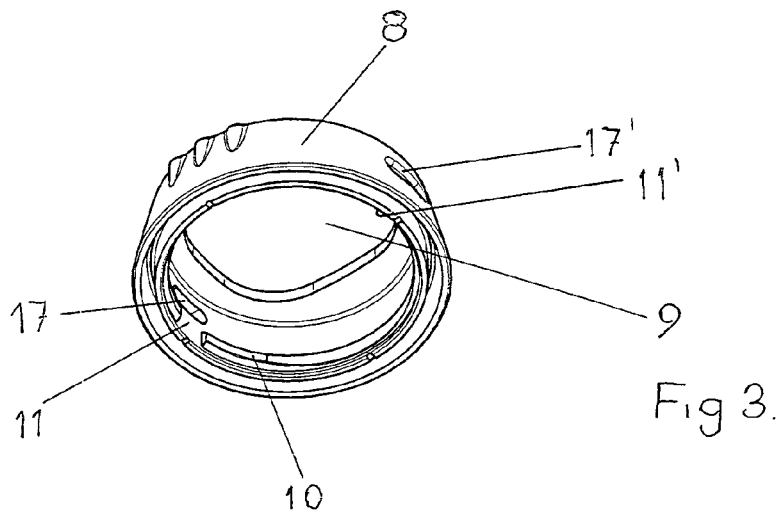
FIG. 3 shows a detailed view of the union nut.
Figure 4:
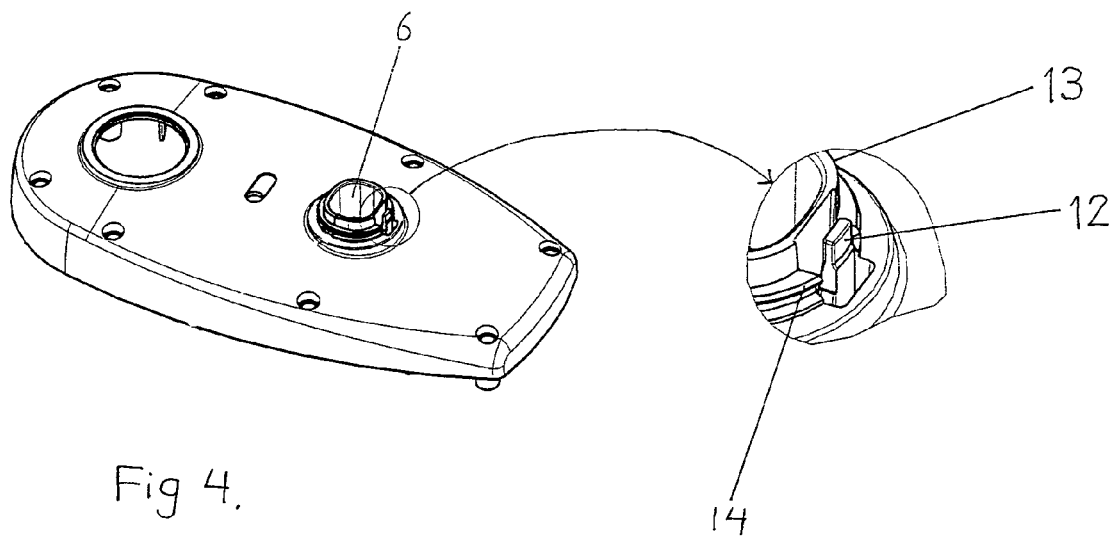
FIG. 4 shows a part of the housing with a detailed view of a sleeve on the socket and a locking pin.

As will appear from FIG. 2, a part is shown, namely the rear end of the housing 2 for the actuator provided with a socket 6 for receiving an electrical plug 7. Surrounding the opening and located over a neck of the socket, there is a union nut 8 having a locking mechanism for locking the plug 7 in position in the socket 6 so that this cannot readily be pulled out.

On the front, the union nut 8 is provided with a hole 9 with a geometrical shape corresponding to the exterior geometrical shape of the plug, so that the plug 7 may be passed through the hole 9 in the union nut 8 and into the socket 6. On the union nut 8, a sleeve 10 is provided on the interior side of the circumference in the entire extent of the circumference, however interrupted by two sections 11. A pin 12 is provided on the edge of the socket. The pin 12 has a structure which allows it to lock in one of the sections 11 of the union nut which is free of the sleeve 10. The socket 6, which is tubular, is extended on the outside of the housing and thus forms a neck 13, whose outer side is provided with a sleeve 14 which serves as a stop for the union nut 8 in the vertical direction when the union nut is snapped down over the neck 13. The sleeve 14 on the neck 13 and the sleeve 10 on the inner side of the union nut 8 thus serve as cooperating snap locking means, which lock the parts together. The union nut 8 can rotate freely on the neck 13 around the opening of the socket, but is locked against rotation when the pin 12 on the edge of the socket 6 is in engagement with the corresponding locking mechanism in the form of the section 11 of the union nut 4.

Figure 5:
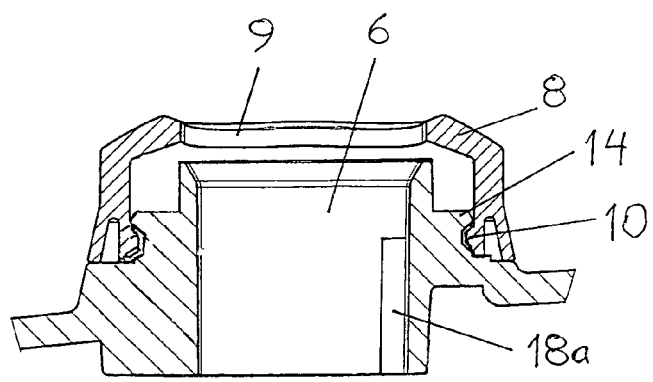
FIG. 5 shows a part of the housing with the socket and the union nut.

FIG. 5 shows how the union nut 8 is snapped down over the neck 13 on the socket. It will readily be seen that the sleeve 14 on the neck and the sleeve 10 on the inner side of the union nut form cooperating snap locking means, which prevent the union nut from falling out of the socket. The snap locking means are dimensioned to have a locking force which is so great that a jerk at the plug 7 does not separate the union nut from the socket, so that the plug and the union nut can fall off.

As the side wall of the union nut is constructed with a double wall, it takes less force to bring the snap locking means into mutual engagement, sine less material will have to be deformed when the union nut is snapped down over the neck 13 of the socket 6. As a further detail, it appears from FIG. 5 that there is a mechanical coding 18a in the socket for the correct positioning of a plug 7 in the socket 6. The counterpart in the form of a recess 18 running in the longitudinal direction of the plug constitutes a corresponding coding on the plug, as will appear from FIGS. 6 and 7. Even though the union nut is rotated to the locked position and the plug is rotated so as to be capable of being inserted through the hole 9 in the front of the union nut 8, it is therefore still not possible to insert the plug 7 into the socket 6.

If it is desired to seal a socket which is not being used, and thus to protect the housing against penetration of liquid or dust, a sealing stopper may simply be mounted in the socket and be locked for removal with the union nut. A sealing stopper may be a dummy plug. In another embodiment, not shown, the union nut is constructed on a stopper. The snap locking means in the form of the sleeves 10, 14, which ensure that the union nut 8 is secured on the socket 6, should here be adapted so that the stopper is secured, but may also be removed if it is desired to insert a plug 7 into the socket. The union nut having a built-in sealing stopper may expediently be rotated for locking in order to retain this securely in the socket.

The plug used and shown in FIG. 7 is an electrical plug of the Minifit type in the multiconnector plug embodiment. Thus, cables both for supply and for signaling may be mounted in the plug. On the plug 7, there is a sleeve 15 which continues around the plug in its entire circumference. The configuration of the hole 9 in the front of the union nut 8 is such as to just allow the sleeve 15 of the plug 7 to be passed through. This means that the shape of the hole 9 in the front of the union nut 8 is identical with the shape of the sleeve 15, although slightly larger. The plug 7 is passed so far through the union nut 8 that the sleeve 15 on the plug 7 disappears immediately below the material which constitutes the front of the union nut 8. Unlike the sleeve 15 of the plug 7, the union nut 8 is constructed as a circle, where the hollow in the union nut forms a circle having a larger radius than the largest radius of the body of the plug, typically a little larger than the largest radius of said sleeve 15. When the union nut is turned ninety degrees for locking, the hole 9 in the front where it forms a small radius, will position itself outside the sleeve 15, where it forms the large radius. This causes the front of the union nut 8 to lock over the sleeve 15 and thus to retain the plug 7 in its position in the socket 6. FIG. 8 shows a plug inserted into a socket having a union nut 8 mounted thereon, where the union nut locks the plug 7 in its position. The wave-shaped finger grips 16 make it easier to get a hold of the union nut 8. To release the lock again, it is necessary to hold in the pin 12 through the hole 17 in the side of the union nut 8 by means of a tool, at the same time as the union 8 is rotated back. It is now possible to remove the plug 7.

As there is only one way to mount the plug in the socket 6, it is furthermore only possible to insert a plug when the union nut 8 is located in the inoperative position. This is due to the mechanical coding, which is carried out in that the plug 7 is provided with a recess 18 which has a counterpart in the socket. If it is not desired to insert a plug 7 into a socket 6, this may be mounted with a sealing stopper, which is subsequently locked by means of the union nut 8.

FIG. 9 shows a cross-section through the part of the housing where a plug 7 is inserted into the socket 6. The union nut 8 locks over the sleeve 15 of the plug, so that this cannot be pulled out. It is conceivable that the plug may be provided with another sleeve, so that the lower sleeve locks below the front of the union nut and the upper sleeve locks above the front of the union nut, so that it is also ensured that the plug cannot move further into the socket when the union nut is rotated to the locked position. Alternatively, the union nut may be provided with a double front where the gap between the two fronts is adapted to grip the sleeve of the plug. With this arrangement the electrical connection between the socket and the plug is protected from being damaged due to possible blows to the plugs.

Figure 10:
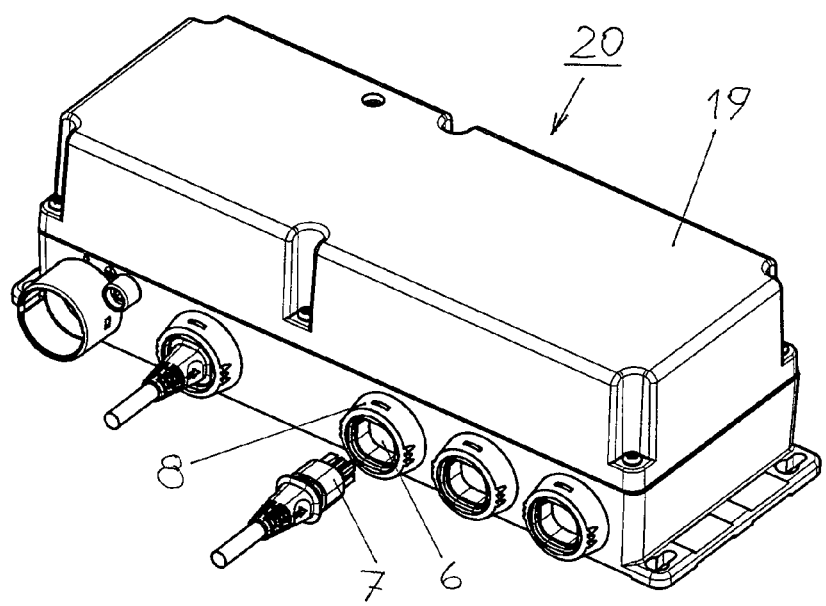
FIG. 10 shows a housing with sockets provided with union nuts for retaining a plug.

FIG. 10 shows a housing 19 for a control unit 20 for an actuator system. It will readily be seen that the sockets are provided with said union nut 8 for the locking of a plug 7 inserted in a socket 6. Thus, the invention does not only relate to the locking of plugs 7 in a socket 6 in connection with actuators 1 as such, but to the locking of plugs in sockets in all kinds of housings for electrically connected units forming part of an actuator system, e.g. an actuator 1, a hand control, a cleaning indicator, a control panel, a reading lamp or, as shown here, a control unit 20.

Figure 11:
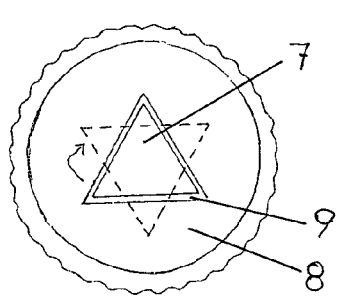
FIG. 11 shows an example of a cross-section of the hole in the union nut.
Figure 12:
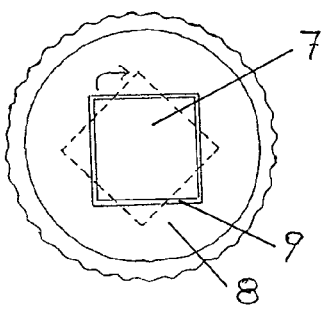
FIG. 12 shows another example of a cross-section of the hole in the union nut.
Figure 13:
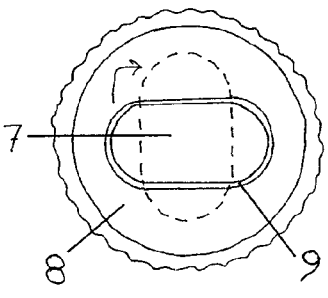
FIG. 13 shows a third example of a cross-section of the hole in the union nut.

As to the configuration of the hole in the union nut 8 there is great freedom for the cross-section of this, as long as the plug may be passed through it and, when this is fully inserted in the socket in an area in the longitudinal direction of the plug located immediately below the front of the union nut and up until immediately above the front of the union nut, has a cross-section which is smaller than the smallest radius in the hole seen from the centre point. More embodiments for the configuration of the profile of the hole are therefore conceivable, as shown in FIG. 11, where the hole 9 is shaped as a triangle. The dotted line shows the profile of the hole in the union nut when this is rotated in relation to the plug 7. In the same way, FIG. 12 shows a square profile. The profile in FIG. 13 is oval and bears most resemblance to the profile known from the MINIFIT plug. In all three profiles, the maximum cross-section which the plug may have in the height of the plug which fits the front in the union nut 8, must be the narrowest cross-section of the hole in the front, if it is to be possible to rotate the union nut all the way around the plug. The part of the plug which does not immerse into the socket and is located over the front, has great freedom when it comes to the configuration and may, e.g., be an angular plug. The part of the plug which immerses into the socket 6 must naturally have a cross-section which is such over the entire length of the plug 7 that the plug 7 may both be passed through the hole 9 in the union nut 8, but may also be inserted correctly into the plug connection in the socket 6. It is emphasized that the three shown examples may be supplemented by a multitude of other examples of cross-sections. All three examples here are symmetrical cross-sections, but it will be appreciated that nothing interferes with the cross-section from being asymmetrical. An asymmetrical hole could render the mechanical coding 18 of the plug and the counterpart 18a in the socket superfluous, as, by such an asymmetrical cross-section, the plug can only be inserted through the socket in one way. Likewise, the hole 9 in the front of the union nut 8 does not have to be centered in the front of the union nut, but may very well be displaced towards the side.

The invention claimed is:

1. An actuator system comprising a socket, a union nut, and a plug, wherein said union nut is rotatably connected to said socket, and wherein said union nut comprises an opening for inserting the plug into said socket,
    wherein the plug comprises a continuous sleeve and wherein the shape of the opening in the union nut is such that when the union nut is turned to:

i) an inoperative position, then the shape of the opening in a front of the union nut is such as to allow the sleeve of the plug to be passed through, whereby the plug may freely be inserted into a removed from the socket, and ii) a locked position, then the front of the union nut locks over said sleeve of the plug, such that the union nut obstructs insertion and removal of the plug from the socket.

2. The actuator system according to claim 1, wherein in its locked position, the union nut is locked by a pin constructed near the socket, said pin being caused to engage a groove in the side wall of the union nut, thereby preventing the union nut from rotating back to the inoperative position.

3. The actuator system according to claim 2, wherein the pin may be activated by means of a tool through a hole in the side wall of the union nut, whereby the union nut is released for rotation and may be rotated back to the inoperative position.

4. The actuator system according to claim 1, wherein the socket is extended as a neck, which is provided with an in itself retreating sleeve, and on the inner side the union nut is provided with a counterpart in the form of a corresponding in itself retreating sleeve, which form cooperating snap locking means for retaining the union nut in connection with the opening of the socket.

5. The actuator system according to claim 4, wherein the union nut is mounted on a tubular neck, which extends the socket for inserting a plug, and including cooperating snap locking means on the outer radius of the neck and on the inner radius of the union nut and retain the union nut in its position in the opening of the socket.

6. The actuator system according to claim 1, wherein immediately below a height where the front of the union nut surrounds the plug and until immediately above the height where the front of the union nut surrounds the plug, the plug, which is inserted into the socket in its longitudinal direction, has a cross-section with a largest radius seen from the radial centre line of the plug, which is smaller at a random point in the entire circumference than the smallest radius in the cross-section in the hole in the front of the union nut, seen from the same radial centre line.

7. The actuator system according to claim 1, wherein the union nut, when rotated into the locked position, displaces a profile of the opening in the front of the union nut relative to a profile of the plug, so that the front of the union nut covers parts of the profile of the plug and thus locks the plug against removal.

8. The actuator system according to claim 7, wherein, in the front, the union nut is provided with an opening having the same geometrical profile as the profile of the plug at the point in the longitudinal direction of the plug where a sleeve is provided.

9. The actuator system according to claim 1, wherein the union nut comprises a stopper which is adapted to the profile of the socket and prevents liquid or dust from penetrating into a socket which is not being used.

10. The actuator system according to claim 1, wherein the plug is constructed as a sealing stopper for insertion into a socket which is not being used, said sealing stopper being constructed as a dummy plug without an electrical wire connection.

11. The actuator system according to claim 1, wherein the plug includes an o-ring for sealing against penetrating liquid or dust.

12. The actuator system according to claim 1, including at least one of the following units:
   i) a linear electrical actuator,
   ii) a control unit,
   iii) an indicator box,
   iv) a control, and
   v) a power supply.

13. The actuator system according to claim 1, wherein the sleeve of the plug is a continuous outwardly-extending flange.

14. The actuator system according to claim 13, wherein the front of the union nut comprises a continuous inwardly-extending lip which defines the opening.

15. The actuator system according to claim 13, wherein the opening of the union nut and out-of-round and the plug has an external configuration which is similarly out-of-round.

* * * * *